US012650970B2

(12) United States Patent
Yak et al.

(10) Patent No.: US 12,650,970 B2
(45) Date of Patent: Jun. 9, 2026

(54) SCALABLE FOUNDATION MODELS FOR PROCESSING STRUCTURED DATA

(71) Applicant: Google LLC, Mountain View, CA (US)

(72) Inventors: Xin Yang Yak, Brooklyn, NY (US); Sercan Omer Arik, San Francisco, CA (US); Yihe Dong, Princeton, NJ (US); Javier Gonzalvo Fructuoso, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/905,090

(22) Filed: Oct. 2, 2024

(65) Prior Publication Data

US 2025/0110940 A1    Apr. 3, 2025

Related U.S. Application Data

(60) Provisional application No. 63/587,691, filed on Oct. 3, 2023.

(51) Int. Cl.
  *G06F 16/22*     (2019.01)
  *G06N 3/08*      (2023.01)
(52) U.S. Cl.
  CPC .......... *G06F 16/2282* (2019.01); *G06N 3/08* (2013.01)
(58) Field of Classification Search
  CPC .................................................. G06F 16/2282
  USPC ........................................................ 707/741
  See application file for complete search history.

(56) References Cited

U.S. PATENT DOCUMENTS

| | | | | |
|---|---|---|---|---|
| 5,729,659 A * | 3/1998 | Potter | ................... | G10L 15/193 |
| | | | | 704/275 |
| 9,514,404 B1 * | 12/2016 | Corrado | ................... | G06N 3/08 |
| 2020/0175314 A1 * | 6/2020 | Fang | ...................... | G06N 3/048 |
| 2021/0319004 A1 * | 10/2021 | Walters | ................... | G06F 16/22 |
| 2023/0104158 A1 * | 4/2023 | Banerjee | .............. | G06N 3/0985 |
| | | | | 382/131 |
| 2023/0162040 A1 * | 5/2023 | Clement | ................ | G06N 3/082 |
| | | | | 706/21 |

OTHER PUBLICATIONS

Arik et al., "TabNet: Attentive Interpretable Tabular Learning," CoRR, Submitted on Dec. 9, 2020, arXiv:1908.07442v5, 13 pages.
Bommasani et al., "On the opportunities and risks of foundation models," CoRR, Submitted on Aug. 16, 2021, arXiv:2108.07258v1, 211 pages.

(Continued)

*Primary Examiner* — Muluemebet Gurmu
(74) *Attorney, Agent, or Firm* — Fish & Richardson P.C.

(57) ABSTRACT

Methods, systems, and apparatuses, including computer programs encoded on computer storage media, for implementing a neural network that can perform one or more machine learning tasks on an input that includes data that represents a given data structure. In particular, implementing a language model to encode the data and a foundation neural network with an attention-based architecture to generate the task output. Because of how language model generated embeddings are defined and cached, the described techniques demonstrate significant improvements in required computational resources for training and inference while also exceeding prediction performance on a variety of prediction tasks over conventional approaches.

29 Claims, 7 Drawing Sheets

(56) References Cited

OTHER PUBLICATIONS

Borisov et al., "Deep neural networks and tabular data: A survey," IEEE Transactions on Neural Networks and Learning Systems, Dec. 2022, 35(6):1-21.

Chen et al., "Towards Learning Universal Hyperparameter Optimizers with Transformers," CoRR, Submitted on Oct. 14, 2022, arXiv:2205. 13320v2, 32 pages.

Chui et al., "Notes from the ai frontier Insights from Hundreds of Use Cases," McKinsey Global Institute, 2018, 36 pages.

Faiss.ai [online], "Welcome to Faiss Documentation," 2021, retrieved on Jun. 12, 2025, retrieved from URL<https://faiss.ai/index.html>, 4 pages.

Fu et al., "HINT: Hierarchical Interaction Network for Trial Outcome Prediction Leveraging Web Data," CoRR, Submitted on Mar. 13, 2020, arXiv:2102.04252v3, 17 pages.

Gharagozlou et al., "RLAS-BIABC: A Reinforcement Learning-Based Answer Selection Using the BERT Model Boosted by an Improved ABC Algorithm," Computational Intelligence and Neuroscience, May 2022, 2022:1-21.

Grinsztajn et al., "Why do tree-based models still outperform deep learning on tabular data?," Paper, Presented at the 36th Conference on Neural Information Processing Systems, New Orleans, LA, Nov. 28-Dec. 9, 2022; Advances in Neural Information Processing Systems, Dec. 2022, 35:1-14.

Hegselmann et al., "TabLLM: Few-shot Classification of Tabular Data with Large Language Models," CoRR, Submitted on Mar. 17, 2023, arXiv:2210.10723v2, 33 pages.

Hollmann et al., "TabPFN: A Transformer That Solves Small Tabular Classification Problems in a Second," CoRR, Submitted on Sep. 16, 2023, arXiv:2207.01848v6, 37 pages.

Huang et al., "Tab Transformer: Tabular Data Modeling Using Contextual Embeddings," CoRR, Submitted on Dec. 11, 2020, arXiv:2012.06678v1, 17 pages.

Jaegle et al., "Perceiver IO: A General Architecture for Structured Inputs & Outputs," CoRR, Submitted on Mar. 15, 2022, arXiv:2107. 14795v3, 29 pages.

Lee et al., "Set transformer: A framework for attention-based permutation-invariant neural networks," CoRR, Submitted on May 26, 2019, arXiv:1810.00825v3, 17 pages.

Li et al., "Towards General Text Embeddings with Multi-stage Contrastive Learning," CoRR, Submitted on Aug. 7, 2023, arXiv:2308. 03281v1, 18 pages.

Muennighoff et al., "MTEB: Massive Text Embedding Benchmark," CoRR, Submitted on Oct. 13, 2022, arXiv:2210.07316v1, 23 pages.

openai.com [online], "Open AI pricing page," Available on or before Sep. 28, 2023, via Internet Archive: Wayback Machine URL <https://web.archive.org/web/20230928125454/https://openai.com/pricing>, retrieved on May 3, 2025, URL <https://openai.com/pricing>, 9 pages.

Somepalli et al., "Saint: Improved neural networks for tabular data via row attention and contrastive pre-training," CoRR, Submitted on Jun. 2, 2021, arXiv:2106.01342v1, pp. 1-18.

Wang et al., "AnyPredict: Foundation Model for Tabular Prediction," CoRR, Submitted on May 20, 2023, arXiv:2305.12081v1, pp. 1-23.

Wang et al., "Transtab: Learning transferable tabular transformers across tables," Paper, Presented at the 36th Conference on Neural Information Processing Systems, New Orleans, LA, Nov. 28-Dec. 9, 2022; Advances in Neural Information Processing Systems, Dec. 2022, 35:1-14.

Yak et al., "IngesTables: Scalable and Efficient Training of LLM-Enabled Tabular Foundation Model," Table Representation Learning Workshop at NeurIPS 2023, 2023, 10 pages.

Zong et al., "DETRs with Collaborative Hybrid Assignments Training," CoRR, Submitted on Nov. 22, 2022, arXiv:2211.12860v1, 12 pages.

* cited by examiner

Neural Network System 100

Task Output 110

Foundation Neural Network 108

Embeddings of the feature key – feature value pairs 106

Data 102

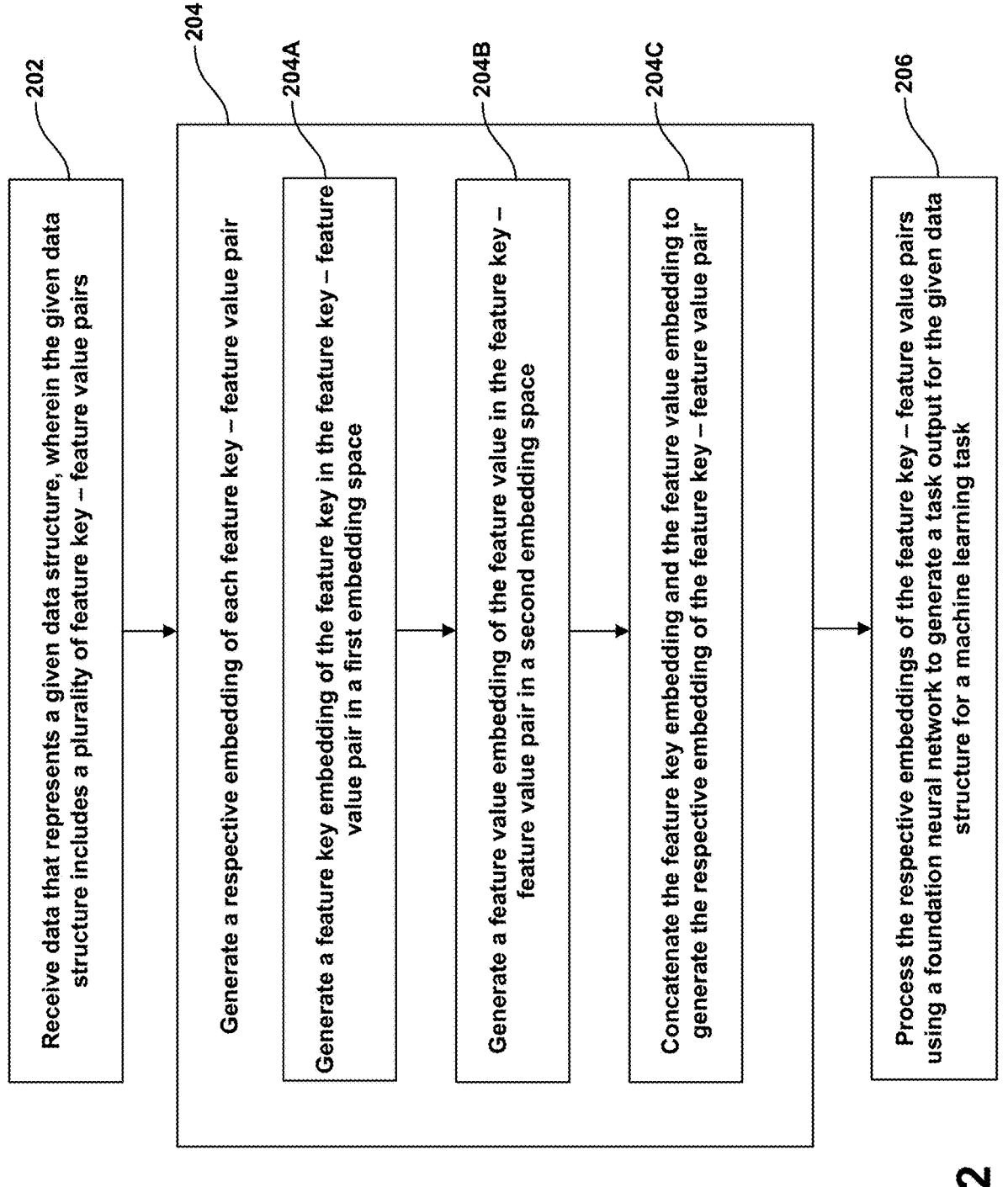

202

Receive data that represents a given data structure, wherein the given data structure includes a plurality of feature key – feature value pairs

204

Generate a respective embedding of each feature key – feature value pair

204A

Generate a feature key embedding of the feature key in the feature key – feature value pair in a first embedding space

204B

Generate a feature value embedding of the feature value in the feature key – feature value pair in a second embedding space

204C

Concatenate the feature key embedding and the feature value embedding to generate the respective embedding of the feature key – feature value pair

206

Process the respective embeddings of the feature key – feature value pairs using a foundation neural network to generate a task output for the given data structure for a machine learning task

602 Receive batch of training examples

604 For each training example, mask out some feature values

606 For each masked out training example, reconstruct the original training example 606 Determine a gradient of a loss function 608 Update parameters

600

| Trial Data | Metrics | XGBoost | IngesTables |
|---|---|---|---|
| Phase I | AUROC | 0.518 | 0.647 ± 0.009 |
| | PRAUC | 0.513 | 0.683 ± 0.007 |
| Phase II | AUROC | 0.600 | 0.655 ± 0.003 |
| | PRAUC | 0.586 | 0.700 ± 0.002 |
| Phase III | AUROC | 0.667 | 0.720 ± 0.006 |
| | PRAUC | 0.697 | 0.874 ± 0.003 |

SCALABLE FOUNDATION MODELS FOR PROCESSING STRUCTURED DATA

CROSS-REFERENCE TO RELATED APPLICATION

This application claims priority to U.S. Provisional Application No. 63/587,691, filed on Oct. 3, 2023. The disclosure of the prior application is considered part of and is incorporated by reference in the disclosure of this application.

BACKGROUND

This specification relates to processing data using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

In some cases, the data at least represents a data structure, i.e., a set of feature key—feature value pairs, e.g., a row of a tabular data structure (where a tabular data structure has one or more columns, one or more rows, the feature keys are the names for the one or more columns and the feature values are the entries in the columns of the tabular data structure). Also, the data structure can be part of a larger data structure, i.e., multiple sets of feature key—feature value pairs, e.g., a tabular data structure (a "table").

SUMMARY

This specification describes a system implemented as computer programs on one or more computers in one or more locations that implements a neural network that can perform one or more machine learning tasks on an input that includes data that represents a given data structure.

In particular, the system employs language models to encode the data and a foundation neural network (i.e., a neural network trained on a large amount of data such that it can be adapted to a wide range of downstream tasks) with an attention-based architecture to generate the task output.

Particular embodiments of the subject matter described in this specification can be implemented so as to realize one or more of the following advantages.

Foundation models are highly successful for image and text data, playing a major role in many state-of-the-art achievements on downstream tasks such as object detection and question answering. A key element to their success is pre-training a high-capacity model on vast amounts of data.

There is a vast amount of public tabular data available for diverse domains, such as finance, healthcare, marketing, telecommunications, utilities, and so on. Often, this tabular data contains important information, such as wildfire occurrence history, e.g., tabular data that include daily and geographical temperature, humidity, wind speed, vegetation type, season type, and whether a wildfire occurred that day in that geographical location.

If tabular datasets contain information that is important, being able to make predictions regarding a tabular dataset can be important. For example, given a table with rows corresponding to geographical locations and columns corresponding to temperature, humidity, wind speed, vegetation type, season type data, being able to predict a new column of wildfire occurrence could help firefighters efficiently allocate resources to protect communities from wildfires.

Developing a foundation model that can predict tabular data would be advantageous, as the foundation model can leverage the vast amount of data to uncover complex relationships among inter-tabular and intra-tabular data entries, generalize well across different tasks, and enhance predictive accuracy across many domains. For example, a developed foundation model for tabular data can be used to predict wildfire occurrences and leverage the complex relationships between previous fire history, temperature, humidity, wind speed, vegetation type, season type data across many different tabular datasets to make predictions of different scenarios.

However, despite the fact that tabular data is the most common data structure type and that large amounts of tabular data may frequently be available for training, building foundation models using tabular data, is a challenge. If foundation models could successfully pre-train on large amounts of tabular data, then they could achieve state-of-the-art performance on downstream tasks that include tabular data such as general classification and regression tasks, e.g., ranking, anomaly detection, clustering, and so on. However, numerous challenges constitute bottlenecks in building models that can effectively leverage this table data, including learning semantic relevance between tables and features, mismatched schemas across different tables, arbitrarily high cardinality for categorical values, and scalability to many tables, rows and features. Ultimately, the diversity among tabular datasets and the diversity of their entry relationships make it challenging to design a 'one-size-fits-all' foundation model, i.e., a foundation model that is broadly applicable across tabular data of different entry types and domains.

This specification describes a system that can address the aforementioned challenges. In particular, the described techniques use embeddings, e.g., generated by a language model, to encode representations of table/feature semantics and the relationships and then models these using a neural network having an attention-based tabular architecture. Unlike other language model based approaches, the described system is much cheaper to train and faster to run inference because of how language model generated embeddings are defined and cached. Moreover, the described techniques demonstrate significant improvements over conventional approaches on a variety of prediction tasks that require making predictions about input data structures.

The details of one or more embodiments of the subject matter of this specification are set forth in the accompanying drawings and the description below.

Other features, aspects, and advantages of the subject matter will become apparent from the description, the drawings, and the claims.

BRIEF DESCRIPTION OF THE DRAWINGS

FIG. 2 is a flow diagram of an example process for processing data to generate a task output using a neural network system.

FIG. 7 shows an example of the performance of the describe techniques.

DETAILED DESCRIPTION

Figure 1:
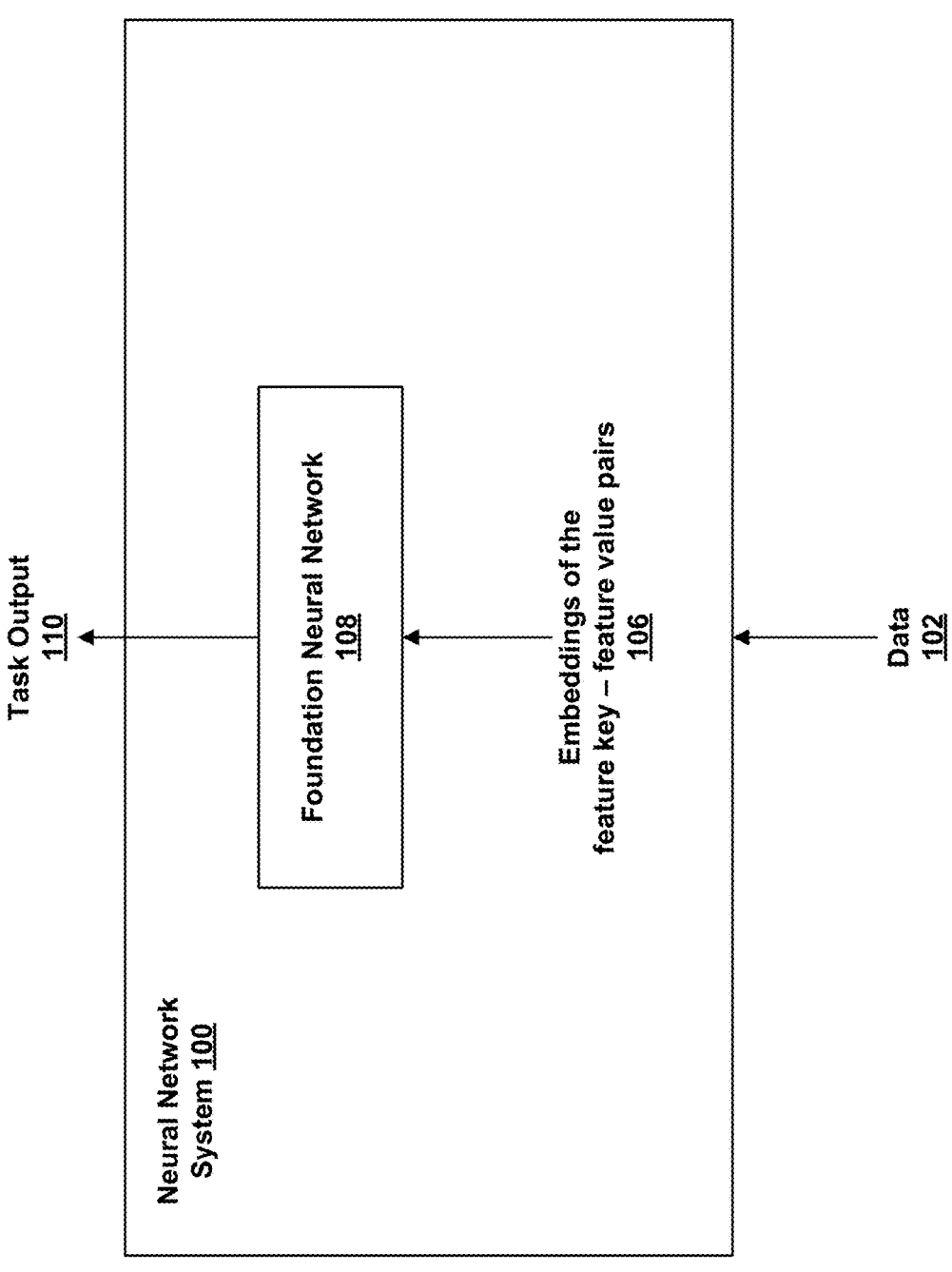
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 is a system that receives data 102 that represents a given data structure and generates a task output 110 for the given data structure for a machine learning task.

Generally, the given data structure has multiple feature key—feature value pairs that each include a respective feature key and a respective feature value. The feature value can be a numerical feature value, e.g., integer numbers, real decimal numbers, floating point values, or any other kind of number. The feature value can also be categorical feature value, i.e., a value that represents a distinct group, e.g., a 'color category' can have categorical feature values 'red', 'green', 'blue', etc.

As a particular example, the given data structure can be a row of a tabular data structure (a "table") that has one or more columns. In this example, the feature keys are the names for the one or more columns and the feature values are the entries in the columns of the table. Thus, each pair corresponds to an entry in the row of the table, with the feature key being the name of the column that contains the entry and the feature value being the entry.

For example, each of the one or more machine learning tasks can require generating a prediction about one or more of the feature values. For example, a task can be to predict one or more feature values that are missing from the given data structure. As another example, the task can be to predict the value of another feature that is related to the given data structure.

More specifically, to perform the task(s), the system 100 can generate a respective embedding of each feature key—feature value pair. In particular, the system 100 can, for each feature key—feature value pair, generate a feature key embedding of the feature key in the feature key—feature value pair in a first embedding space and generate a feature value embedding of the feature value in the feature key—feature value pair in a second embedding space, which can be the same embedding space as the first or can be different.

As used in this specification, an "embedding" is an ordered collection of numerical values, e.g., a vector of floating point values or other numerical values, and the "embedding space" is the number of values in the ordered collection, e.g., the number of entries in the vector. Thus, each embedding in a given embedding space has the same number of numerical values.

The system 100 can then concatenate the feature key embedding and the feature value embedding to generate the respective embedding of the feature key—feature value pair.

The system 100 then processes the respective embeddings of the feature key—feature value pairs 106 using a foundation neural network 108 to generate a task output 110 for the given data structure.

The neural network 108 is referred to as a "foundation" neural network because the same pre-trained neural network can be used to perform multiple different downstream tasks on appropriate new data representing any type of data structure, either after fine-tuning or in a zero-shot manner without fine-tuning.

Further details of processing data to generate a task output using a neural network system are described below with reference to FIGS. 2 and 3.

Further details of an example foundation neural network are described below with reference to FIGS. 3 and 4.

Further details of training a foundation neural network will be described below with reference to FIG. 6.

FIG. 2 is a flow diagram of an example process 200 for processing data to generate a task output using a neural network system. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system receives data that represents a given data structure that includes a plurality of feature key—feature value pairs (step 202). As described earlier, the data structure can have any form, e.g., row of a tabular data structure, so long as it includes information regarding feature key—feature value pairs.

For example, the data can correspond to a programming language dictionary object, e.g., a Python 'dictionary' object that can store feature keys as 'Python dictionary keys', and respective feature values as respective 'Python dictionary values'.

As another example, the data can correspond to a text-based data format that is used to store and exchange data, such as JSON (JavaScript Object Notation), YAML (Yet Another Markup Language), or XML (Extensible Markup Language), where the feature key—feature values are stored in a text-based representation.

The system generates a respective embedding of each feature key—feature value pair (step 204) by performing steps 204A-C.

The system generates a feature key embedding of the feature key in the feature key—feature value pair in a first embedding space (step 204A).

Generally, for step 204A, the system generates a first input sequence that includes the feature key and then processes the first input sequence using a language model neural network to generate the feature key embedding of the feature key.

For example, the first input sequence can be the natural language prompt "feature: <feature_name>", where <feature_name> is the feature key. As a more specific example, if the feature key—feature value pair were "customer location"—"U.S.A", the first input sequence can be the natural language prompt "feature: customer location".

In some implementations, the first input sequence includes a name associated with the given data structure. The name can be a semantically meaningful name or a task description.

For example, the name can be the name of the tabular data structure when the data represents a row of a tabular data structure. As specific examples of semantically meaningful names, the name can be "Table 1: Customer details", or "Table 2: Transactions". As specific examples of task description names, the name can be "Money laundering prediction for new bank branches" or "Customer credit card recommendation".

As a specific example, for the name "Table 1: Customer details" associated with the data structure that includes the feature key—feature value pair "customer location"—

"U.S.A", the first input sequence can be the natural language prompt "table: Table 1: Customer details \n feature: customer location".

Generally, the language model neural network can be any appropriate neural network that generates a fixed-sized embedding for the first input sequence. In particular, the language model neural network can have been pre-trained prior to the training of the foundation neural network and then held fixed during the training of the foundation neural network and at inference.

For example, the language model can be GTE-large (as described in ArXiv: 2308.0328), NV-Embed-v2, bge-enicl, stilla_en_1.5B_v5, or any other language model embedding model described in ArXiv: 2210.07316.

In some implementations, when the system generates the feature key embedding of the feature key, the system processes the first input sequence using a language model neural network to generate an initial feature key embedding of the feature key, and then, processes the initial feature key embedding using an alignment layer to generate the feature key embedding of the feature key. Because the initial feature key embedding does not necessarily have the required dimensions for the foundation neural network model to process, the system can use an alignment layer, e.g., a fully connected layer, to adjust the feature key embedding and ensure compatibility.

In some implementations, the system includes memory, which stores feature key embeddings of feature keys that appeared in training data for the foundation neural network.

The system memory can be implemented, for example, through memorization, an optimization technique used to speed up computer programs by storing the results of expensive function calls and returning the cached result when the same inputs occur again.

As a specific example, the memory can be implemented using Python-functools-module's cache function.

As another specific example, the memory can be implemented using Faiss (a library for efficient similarity search and clustering of dense vectors as described in https://faiss.ai/index.html).

As another example, the memory can be implemented as a vector store, i.e., a database or storage system designed to maintain and retrieve high-dimensional embeddings (i.e., vectors).

As a specific example, the memory can be implemented using SingleStore (a distributed, relational, SQL database management system known for speed in data ingest, transaction processing, and query processing).

In some implementations, the system only generates and processes the first input sequence that includes the feature key using the language model neural network in response to determining that the feature key embedding for the feature key does not appear in the memory. For such implementations, when the feature key embedding for the feature key appears in the memory, the system can use the feature key embedding that appears in the memory as the feature key embedding.

The system generates a feature value embedding of the feature value in the feature key—feature value pair in a second embedding space (step 204B).

Generally, for step 204B, the system generates a second input sequence that includes the feature key and the feature value and processes the second input sequence using a language model neural network to generate the feature value embedding of the feature value.

In particular, in some implementations, in response to determining that the feature value is a categorical feature value, the system generates a second input sequence that includes the feature key and the feature value. Then, the system processes the second input sequence using the language model neural network to generate the feature value embedding of the feature value.

For example, the second input sequence can be the natural language prompt "feature: <feature_name>\n value: <feature_value>", where <feature_name> is the feature key and <feature_value> is the feature value. As a more specific example, if the feature key—feature value pair were "customer location"—"U.S.A", the second input sequence can be the natural language prompt "feature: customer location \n value: U.S.A".

Just as is the case for the first input sequence, the second input sequence can include a name associated with the given data structure, and the name can be the name of a tabular data structure.

As a specific example, for the name "Table 1: Customer details" associated with the data structure that includes the feature key—feature value pair "customer location"—"U.S.A", the second input sequence can be the natural language prompt "table: Table 1: Customer details \n feature: customer location \n value: U.S.A".

In some implementations, in response to determining that the feature value is a numerical feature value, the system quantile normalizes the numerical feature value to generate the feature value embedding of the feature value. Then the system generates and processes a second input sequence that includes the feature key and the updated feature value using the language model neural network to generate the feature value embedding of the feature value.

As an example of the system quantile normalizing a numerical feature value to generate the feature value embedding of the feature value, the system can quantile normalize the numerical feature value, followed by soft-binning by taking the softmax over the negative squared distance to each bin center, uniformly spaced apart on the unit interval, followed by mapping the corresponding bin to a N-dimensional L1 unit sphere, where N is the number of bins.

What follows is a particular example of the previously described example for a system using 4 quantiles, i.e., [0.00,0.25), [0.25,0.50), [0.50,0.75), [0.75,1.00) and 5 bin edges 0.00, 0.25, 0.50, 0.75, 1.00 with corresponding 4 bin centers 0.125, 0.375, 0.625, 0.875 to quantile normalize a numerical feature value of 50 to generate the feature value embedding of the feature value.

The system estimates the quantiles using a random sample of data, e.g., the random sample (25, 50, 75, 100) will cause the system to quantile normalize the value 50 to 0.375.

The system then computes the softmax over the negative squared distance to each bin center, i.e., ~0.00, ~1.00, ~0.00, ~0.00, to select the bin according to a probability in proportion the softmax values. For this example, the system selects the 2nd bin corresponding to the interval [0.25,0.50).

The system then maps the selected bin to a 4-dimensional L1 unit sphere, i.e., a one-hot encoded vector that corresponds to the selected bin. For this example, the one-hot encoded vector is (0,1,0,0), where the value of 1 in the second position denotes that the system selected 2nd bin and the value of zero denotes that system did not select that bin.

Generally, the language model neural network for step 204B is the same language model neural network used for step 204A.

In some cases, generating the feature value embedding of the feature value includes processing the second input sequence using the language model neural network to generate an initial feature value embedding of the feature value, and then, processing the initial feature value embedding using an alignment layer to generate the feature value embedding of the feature value. Because the initial feature value embedding does not necessarily have the required dimensions for the foundation neural network model to process, the system can use an alignment layer, e.g., a fully connected layer, to adjust the feature value embedding and ensure compatibility.

In some implementations, the system includes memory, which stores feature value embeddings of feature values that appeared in training data for the foundation neural network. Generally, the memory for step 204B is the same memory used for step 204A.

In some cases, the system only generates the second input sequence and processes the second input sequence using the language model neural network in response to determining that the feature value embedding for the feature value does not appear in the memory. For such implementations, when the feature value embedding for the feature value appears in the memory, the system can use the feature value embedding that appears in the memory as the feature value embedding.

The system concatenates the feature key embedding and the feature value embedding to generate the respective embedding of the feature key—feature value pair (step 204C). That is, the system concatenates the feature key embedding and the feature value embedding along the embedding dimension, i.e., increasing embedding dimensionality while maintaining the length of the sequence. The system processes the respective embeddings of the feature key—feature value pairs using a foundation neural network to generate a task output for the given data structure for a machine learning task (step 206).

The foundation neural network that generates the task output can have any appropriate architecture in any appropriate configuration that processes embeddings of the feature key—feature value pairs to generate task outputs, including fully connected layers, convolution layers, recurrent layers, attention-based layers, and so on, as is appropriate.

Further details of an example foundation neural network are described below with reference to FIG. 4.

Further details of training a foundation neural network will be described below with reference to FIG. 6.

Figure 3:
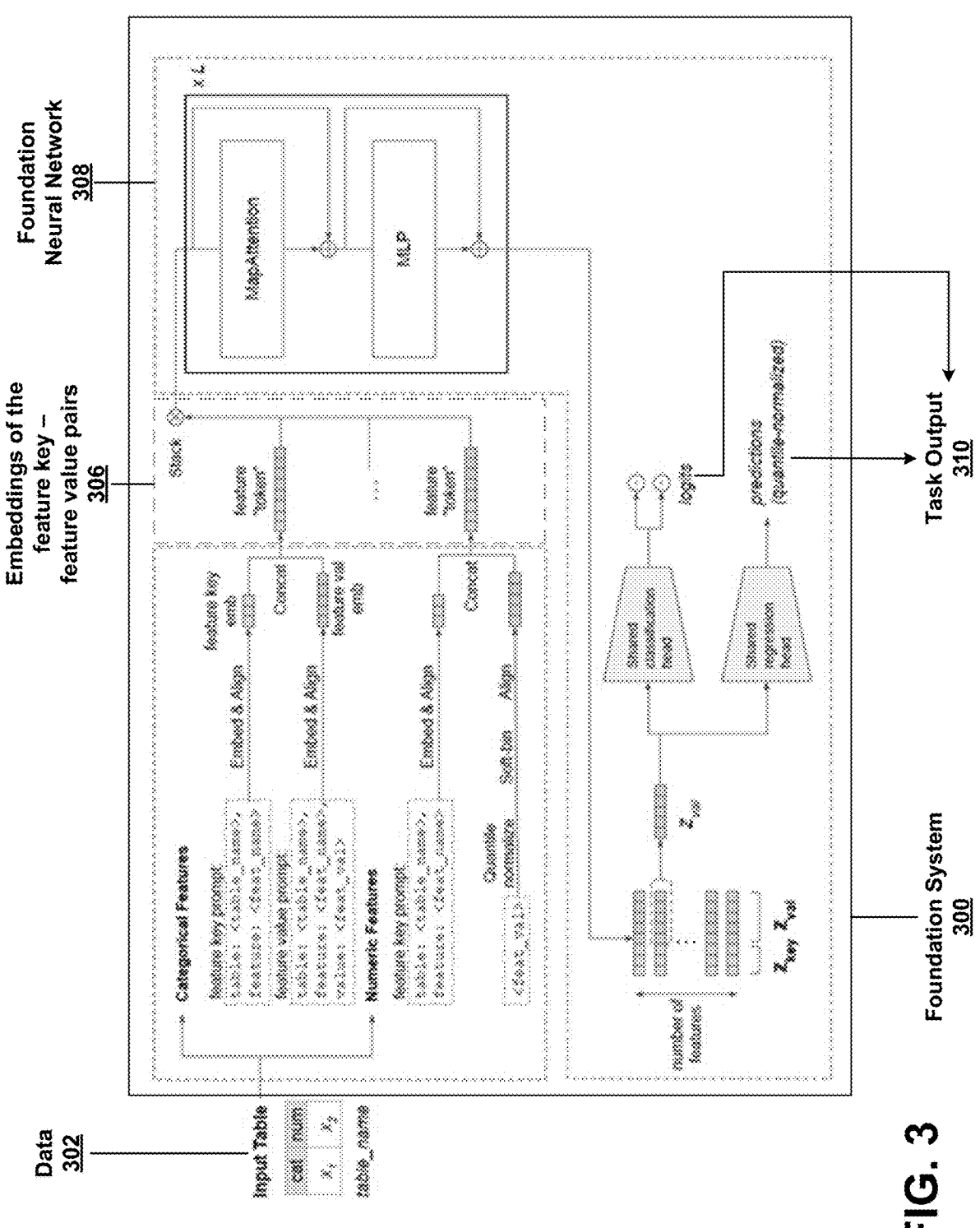
FIG. 3 shows an example neural network system.

FIG. 3 shows an example neural network system 300. The neural network system 300 is an example of a system implemented as computer programs on one or more computers in one or more locations, in which the systems, components, and techniques described below can be implemented.

The neural network system 300 converts a row of an input table, i.e., data 302 representing a row of a tabular data structure, into a sequence of feature embeddings (i.e., embeddings of the feature key—feature value pairs 306), which is then sent to the foundation neural network 308.

While only two feature key—feature value pairs are shown in FIG. 3, in practice the system 300 can process any number of feature key—feature value pairs.

To create the embeddings of the feature key—feature value pairs 306, the system 300 converts all feature key-value tuples belonging to the data 302 into feature embedding vectors, then stacks them along a new axis into a 2D array, resulting in embeddings of the feature key—feature value pairs 306.

To create the feature embedding vectors the system 300 uses a frozen embedding language model, e.g., GTE-large, NV-Embed-v2, bge-encl, stilla_en_1.5B_v5 or any other language model embedding model described in in ArXiv: 2308.03281 or ArXiv: 2210.07316, to encode entire feature keys and feature values into embedding spaces while including the task context, i.e., name associated with the given data structure, i.e., a semantically meaningful table name or a task description.

Additionally, the system 300 performs quantile normalization on the numeric feature values before passing the numeric values to the frozen embedding language model, e.g., as described above with reference to FIG. 2.

To generate a feature key embedding of the feature key in the feature key—feature value pair in a first embedding space, the system 300 inserts the table name and or task context (i.e., name associated with the given data structure, which can be a semantically meaningful table name or a task description) and feature key into a prompt template and passes this prompt through an embedding language model to obtain the feature key embedding. Note that the system 300 only needs to do this once for each feature key for each dataset ever encountered, since the system 300 can cache the language model outputs.

To generate a feature value embedding of the feature value in the feature key—feature value pair in a second embedding space for categorical feature values, the system 300 inserts the table name and or task context, feature key, and feature value into a prompt template, and passes this prompt through an embedding language model to obtain the feature value embedding. Again, due to caching, the system 300 only needs to do this once for each unique categorical value for each feature key for each dataset encountered. This approach also gracefully handles out-of-vocabulary categories as it would use the semantic meaning of the feature key.

To generate a feature value embedding of the feature value in the feature key—feature value pair in a second embedding space for numerical values, the system 300 uses quantile normalization, followed by soft-binning by taking the softmax over the negative squared distance to each bin center, uniformly spaced apart on the unit interval, e.g., as described earlier with reference to FIG. 2. As a result, a language model forward pass is not necessary for every feature key—feature value pair due to caching the results of using finite quantiles and finite bins, e.g., 100 quantiles and 100 bins.

Because the frozen embedding language model is fixed, the system can cache the embedding outputs, thereby allowing the language model inference costs associated with processing more data 302 to scale with metadata size, instead of the dataset size. That is, after the system 300 generates an embedding using the frozen embedding language model for a feature key using a first input sequence or feature value using a second input sequence for a first time, when the system 300 processes the same respective first input sequence or second input sequence a second time, the system 300 uses the cached result from the first time instead of needing to re-generate the embedding.

After the system 300 creates the embeddings of the feature key—feature value pairs 306, the system 300 processes the embeddings 306 using the foundation neural network 308 to generate updated feature key—feature value pairs embeddings.

The example foundation neural network 308 includes L attention layers, which each include a MapAttention layer and a multi-layer perceptron layer (i.e., a feedforward layer), and two output subnetworks: one for generating categorical values called "Shared classification head", and one for generating numeric values called "Shared regression head".

Further details of an example MapAttention layer are described below with reference to FIG. 5.

The system 300 uses the output subnetworks to process the updated feature value embedding for a particular feature value to generate the prediction (i.e., task output 310) characterizing the particular feature value. That is, the shared classification head and the shared regression head processes the embedding from the corresponding position of a particular updated feature value (i.e., feature value embedding) to map the embedding to an output (a numerical value and logit scores) included in the task output 310 for every feature value that the system 300 will perform inference for.

A user, the system 300, or another system decides which portion of the task output 310, i.e., the output of the shared classification head or the shared regression head, is relevant for the task.

For example, a user can decide that the classification head output is the relevant portion of the task output 310 and extract that portion of the output 310. Conversely, a user can decide that the regression head output is the relevant portion of the task output 310 and extract that portion of the output 310.

As another example, the system 300 or another system can process the name associated with the given data structure, i.e., a semantically meaningful table name or a task description, to determine which portion of the task output 310 is relevant for the task. As a particular example, the system 300 or another system can use a language model to process the name associated with given data structure to determine which portion of the task output 310 is most likely relevant for the task.

Figure 4:
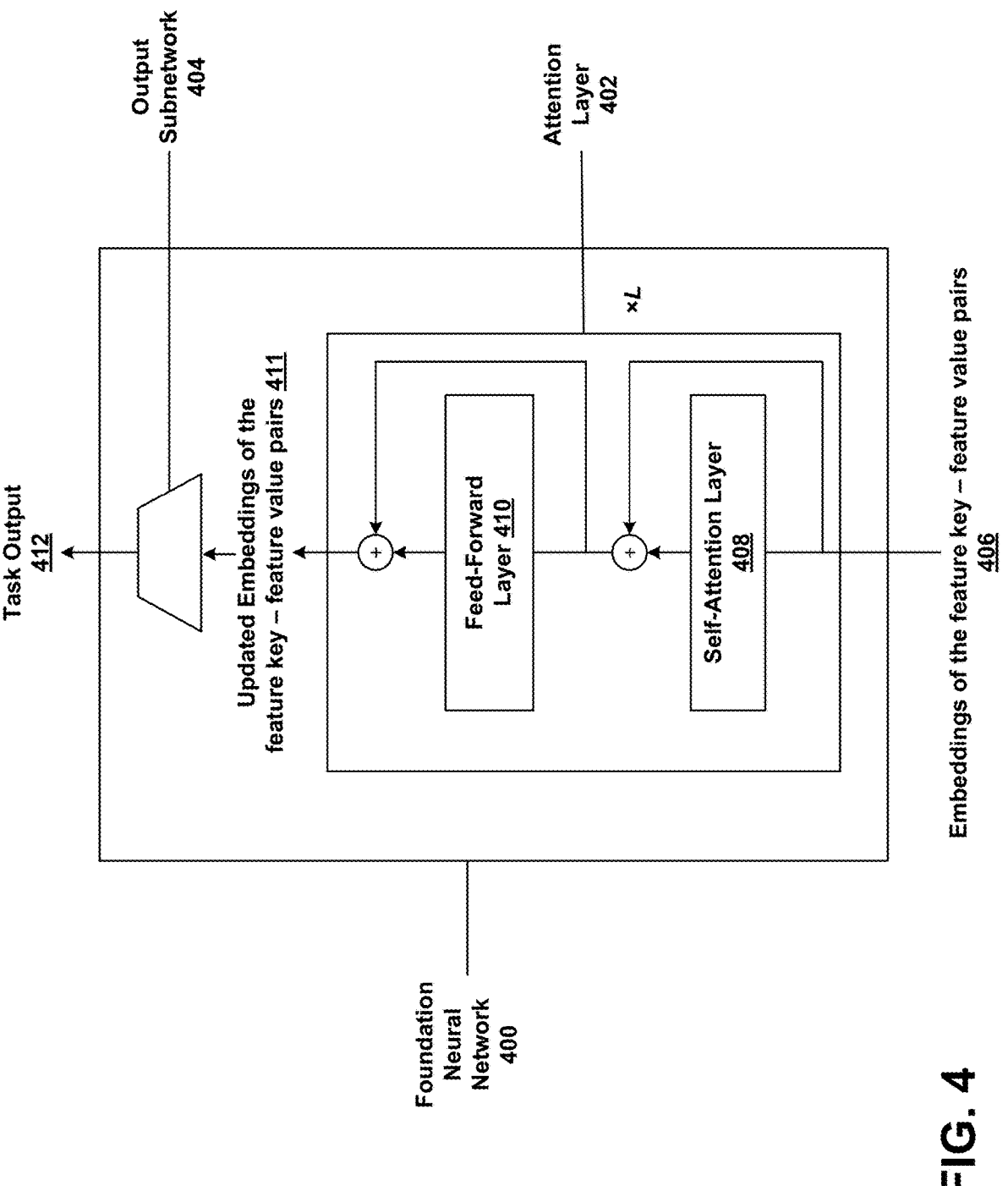
FIG. 4 shows an example foundation neural network.

FIG. 4 shows an example foundation neural network 400.

The foundation neural network 400 processes the embeddings of the feature key—feature value pairs 406 and generates a task output 412. In particular, the foundation neural network 400 includes a sequence of attention layers 402 that each update the respective embeddings of the feature key—feature value pairs 406 by updating the respective feature key embedding and the respective feature value embedding in the respective embedding of the feature key—feature value pair, and where each attention layer includes (i) a self-attention layer 408 followed by (ii) a feed-forward layer block 410. The results are updated embeddings of the feature key—feature value pairs 411.

In some cases, each feed-forward layer block 410 updates the respective embedding of each of the feature key—feature value pairs independently of each other respective embedding. In some implementations, the self-attention layer includes one or more MapAttention layers. Further details of an example MapAttention layer are described below with reference to FIG. 5.

In some cases, the foundation neural network 400 can include an output subnetwork 404 which in turn can include one or more output heads, e.g., a regression head, a classification, or both, but does not include per-task or per-dataset output heads. For such cases, the output subnetwork 404 processes the updated embeddings of the feature key—feature value pairs 411 to generate task outputs 412. In particular, the task output 412 includes a prediction characterizing a particular feature value in the given data structure. That is, processing the respective embeddings of the feature key—feature value pairs using the foundation neural network to generate the task output 412 for the given data structure includes processing the updated feature value embedding for the particular feature value using an output subnetwork 404 to generate the prediction characterizing the particular feature value.

Prior to using the neural network system to generate task outputs, the neural network system or another training system trains (pre-trains, fine-tunes, or both) the foundation neural network 400 on a set of training examples.

The set of training examples the training system receives generally includes a variety of datasets (i.e., sets of data that each include a plurality of feature key—feature value pairs) that might be labeled or unlabeled for given tasks and can each include differently named but semantically related features. That is, the training examples can include any of a variety of data structures that may or may not be the same data structure type and may or may not have common numbers of features, types of features, number of feature key—feature value pairs, and so on.

For example, the variety of datasets can be a set of tabular data structures that include varying schemas, statistics, and tasks along with numeric features of different scales, categorical features with different numbers of classes and class balance, and different total number of features.

One example of training the foundation neural network 400 using a self-supervised approach with a hybrid contrastive learning and regression objective is described below with reference to FIG. 6.

Figure 5:
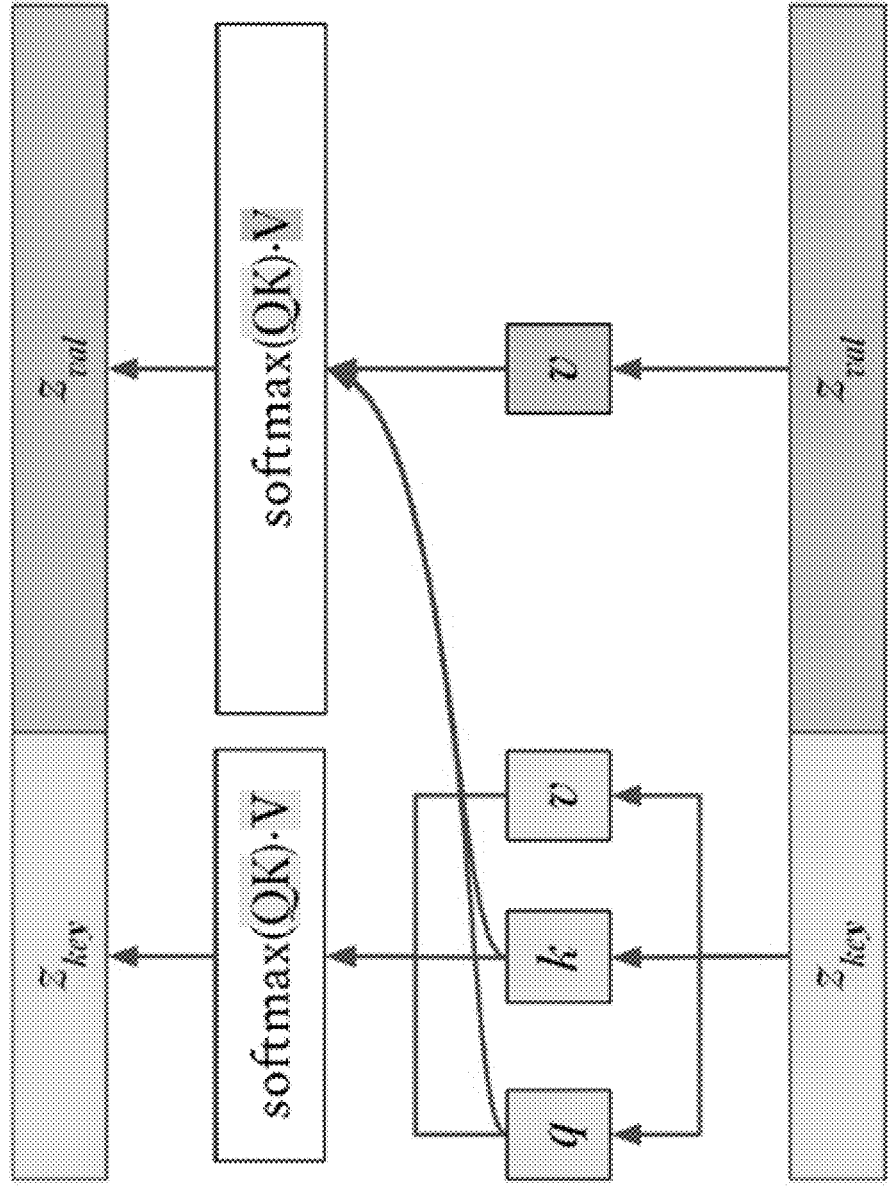
FIG. 5 shows an example MapAttention layer.

FIG. 5 shows an example MapAttention layer 500.

More specifically, FIG. 5 shows an example MapAttention layer 500 for which, $z_{key}$ and $z_{val}$ are the embeddings of the feature key—feature value pairs. More specifically, $z_{key}$ is the sequence of embeddings for the feature keys, and $z_{val}$ is the sequence of respective embeddings of feature values.

The example MapAttention layer 500 is configured to, for each feature key—feature value pair, (i) determine a respective value for the feature key in the pair from the feature key embedding in the respective embedding for the feature key—feature value pair layer, (ii) determine a respective value for the feature value in the pair from the feature value embedding in the respective embedding for the feature key—feature value pair, (iii) determine a respective query for the feature key—feature value pair from the feature key embedding in the respective embedding for the feature key—feature value pair, and (iv) determine a respective key for the feature key—feature value pair from the feature key embedding in the respective embedding for the feature key—feature value pair.

For each particular feature key—feature value pair, the MapAttention layer 500 determines a respective attention weight for each feature key—feature value pair from the respective query for the particular pair and the respective keys for the pairs. Then the MapAttention layer 500 applies the respective attention weights to the respective values for the feature keys to generate an updated feature key embedding for the feature key in the particular pair. Likewise, the MapAttention layer 500 also applies the respective attention weights to the respective values for the feature values to generate an updated feature value embedding for the feature value in the particular pair.

To simply summarize, the MapAttention layer 500 updates a received $z_{key}$ using attention weights and values for the feature keys; and updates a received $z_{val}$ using attention weights and values for the feature values.

Note that the feature value embeddings are not used to compute attention weights (i.e., the respective keys and queries for the pairs are not determined using any feature value embeddings). This way, the system can mask out a feature value embedding without masking out the corresponding feature key embedding. Thus, the system can use the feature key embedding to compute attention weights. Then the system can use the attention weights to reconstruct the masked feature values using other feature values during masked input prediction. This allows the use of masked input prediction as a way to perform self-supervised learning on unlabeled data structures as described earlier in a scalable way.

Figure 6:
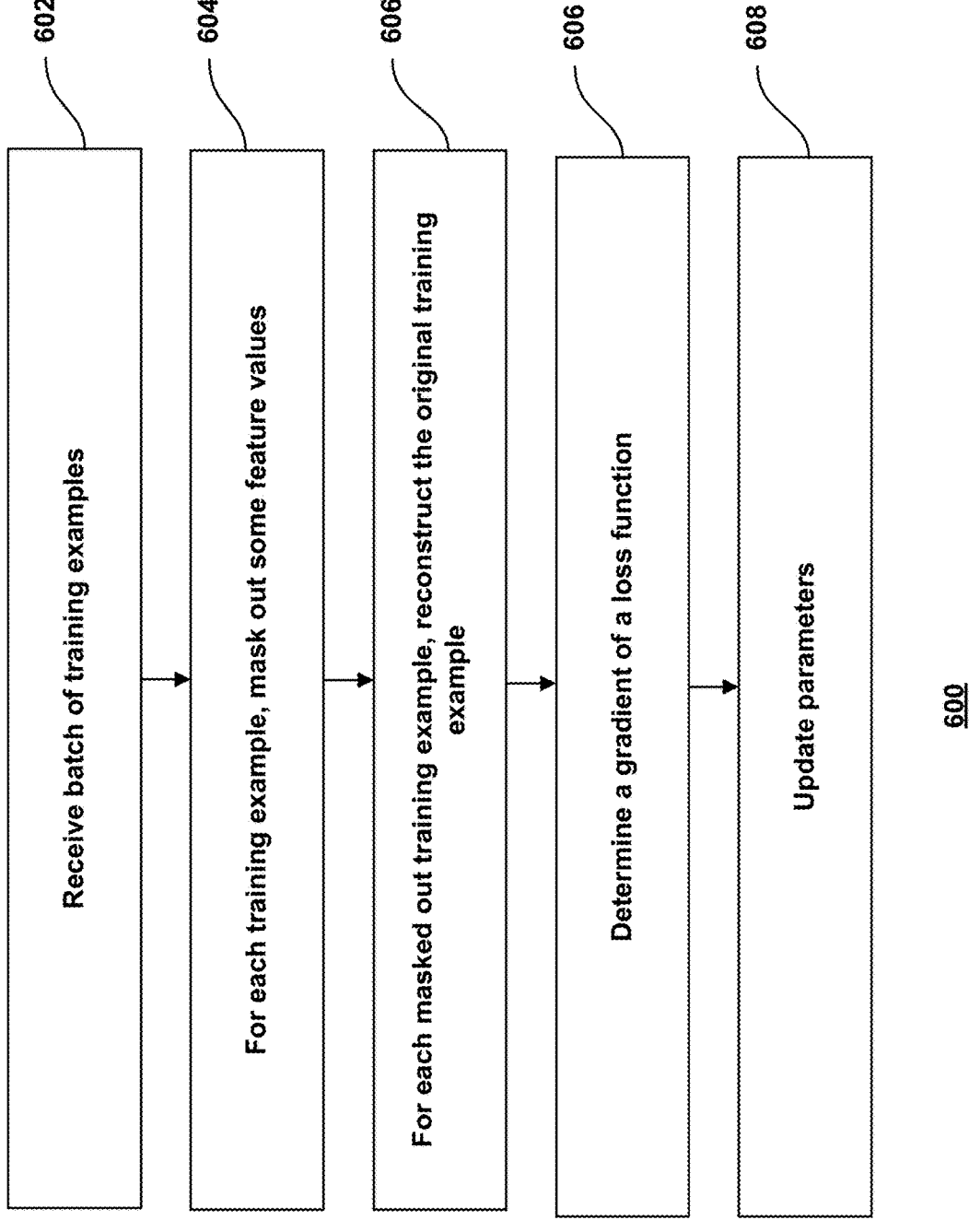
FIG. 6 is a flow diagram of an example process for training a foundation neural network.

FIG. 6 is a flow diagram of an example process 600 for training a foundation neural network. For convenience, the process 600 will be described as being performed by a system of one or more computers located in one or more locations. For example, a neural network system, e.g., the neural network system 100 of FIG. 1, appropriately programmed in accordance with this specification, can perform the process 600.

The system can repeatedly perform the following described example process using training examples to train a foundation neural network, e.g., the example foundation neural network 400 described with reference to FIG. 4, from scratch, i.e., train from randomly initialized parameters, or fine-tune, i.e., further train.

The system receives a batch of training examples (step 602). That is, at each of multiple iterations, the system can obtain, e.g., by random sampling, a set of one or more training examples.

For such training, at each training step, the system can randomly mask out some feature values (step 604) in the input training examples.

For each masked out training example, the system can reconstruct the original training example. That is, the system can process each masked out training example to generate respective updated embeddings of the feature key—feature value pairs to reconstruct the original input training examples, and compute a loss (described below).

The system determines a gradient of a loss function (step 606) using the reconstruction.

The output space of the plurality of feature key—feature value pairs correspond to each position of the updated feature value embedding of the updated embeddings of the feature key—feature value pairs, where each position represents a feature that could be a categorical or a numeric feature.

For categorical features of tabular modeling, the system can use the updated feature value embedding to classify the masked categorical feature value. That is, the system can pass the feature value embedding from the corresponding position through the classification head of the output subnetwork to obtain z (e.g., a vector of scores, e.g., logit values or probability values for each class). Simultaneously, the system can use the masked categorical feature value, and one other different categorical value for that feature within a batch, compute their embeddings using the same embedding language model as used for the masked training example, and pass them through the output subnetwork. The output vector for the "correct" category is denoted as $z^+$, and the output vector for the "incorrect" category is denoted as $z^-$. The system can then compute the loss of $l=-\log(\exp z \cdot z/(\exp z \cdot z^+ + \exp z \cdot z^-))$. Intuitively, one can think of this loss as the softmax cross-entropy loss where $z \cdot z^+$ is the likelihood of the correct prediction, and $z \cdot z^-$ is the likelihood of the incorrect prediction. Alternatively, one can think of loss as the log probability of making the correct prediction. For numeric features of tabular modeling, the system can use the updated feature value embedding to reconstruct the masked input value. That is, the system can use the regression head of the output subnetwork to obtain a scalar. Then, the system can compute the mean squared error loss between the scalar output and the quantile normalized input value. Note that for this example the inputs are already quantile normalized, so the different numeric features are not on different scales and do not have different skewness.

Although two specific losses for categorical values and numerical are discussed above, the training system can use any of a variety of loss functions, and the loss functions can include regularization terms for the learnable parameters, such as the L-1 (LASSO regularization) and L-2 (ridge regression regularization) variants of the L-p norm.

The system updates parameters (step 608) of the foundation neural network using the gradient of the loss function. In order for the training system to minimize the loss of one or more training examples (whether for numeric or categorical features) described above, the training system can generally use any of a variety of gradient descent techniques (e.g., batch gradient descent, stochastic gradient descent, or mini-batch gradient descent) that include the use of a backpropagation technique to estimate the gradient of the loss with respect to foundation neural network parameters and then use the gradient to update the parameters of the foundation neural network.

Once the system finishes training, e.g., pre-training, fine-tuning, or both, at inference, unless there are out-of-vocabulary categorical features encountered, the system only needs to query its memory, e.g., a pre-populated vector store, to prepare embeddings of the feature key—feature value pairs for the foundation neural network, whose latency is negligible compared to that of an embedding language model. As a result, the ability to cache the embedding language model results yields significant increases in training speed and execution speed.

As an illustrative example of the increased speed, consider an embedding language model that has a 1 second latency for processing an input to generate an output and a 1 microsecond latency for loading embeddings from the cache. If there are 1 million inputs (but only 10 unique inputs) for the language model to process, processing the inputs without caching results in a latency of 1 million seconds, while processing with caching results in a 10 second latency for processing the 10 unique inputs and ~1 second latency for reading the 999,990 cached outputs. Thus, when there is large number of training examples or potentially uncountable amount of received data, caching embeddings as described above significantly decreases the latency in processing of the system.

In some cases, prior to pre-training, the system preprocesses the respective key features in the training data structures using the language model neural network to generate respective key embeddings for each of the key features. By pre-processing the respective key features in the training data, the system lowers the latency response of the training process (and also later inference processes), making the system more efficient.

FIG. 7 shows an example 700 of the performance of the described techniques.

More specifically, FIG. 7 shows the performance of IngesTables (i.e., the described techniques) and XGBoost (a decision tree ensemble machine learning model) on tabular data of clinical trials outcomes. The clinical trial data contains drug, disease, and eligibility information for 17K clinical trials, that constitute the target task. The task is binary classification for the trial outcome, whether it is success or failure. To pre-train the foundation neural network neural network, a system trains the foundation neural network on the trial database containing 220K clinical trials with information about the trial setup (such as title, phase, enrollment, conditions, etc.) from 'ClinicalTrials.gov'. Both pre-training and evaluation datasets cover phases I, II, and III.

IngesTables (i.e., the described techniques) significantly outperforms the generic tabular learning model XGBoost 15-20% on all three tasks. The AUROC (area under the receiver operator curve) metric evaluates a classifier's ability to distinguish between classes (i.e., a successful trial or failed trial), while the PRAUC (precision recall area under curve) metric evaluates a classifier's ability to balance precision (i.e., proportion of correctly identified successful trials out of all identified successful trials) and recall (i.e., proportion of correctly identified successful trials out of all trials that actually were successful). Across all phases and metrics, the described techniques outperform the conventional tabular learning model.

One reason the neural network system using the described techniques achieves its impressive performance is that it benefits from transfer learning across the 'ClinicalTrials-.gov' data used to pre-train the foundation neural network and the test clinical trial outcomes. That is, the neural network system can utilize pretraining datasets to bring prior knowledge to new datasets and readily map them to meaningful representations.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving data that represents a row of a tabular data structure, wherein the tabular data structure has a plurality of columns each having a respective column name and the row of the tabular data structure has a respective entry in each of the plurality of columns, and wherein the data that represents the row comprises a respective feature key-feature value pair for each of the plurality of columns;
generating, for each of the plurality of columns, a respective embedding of the respective feature key-feature value pair for the column, comprising, for each feature key-feature value pair:
generating a feature key embedding of the respective column name for the column in a first embedding space;
generating a feature value embedding of the respective entry in the column for the row in a second embedding space; and
concatenating the feature key embedding of the respective column name for the column and the feature value embedding of the respective entry in the column for the row to generate the respective embedding of the feature key-feature value pair for the column; and
processing the respective embeddings of the feature key-feature value pairs for the plurality of columns using a foundation neural network to generate a task output for the given row of the tabular data structure for a machine learning task.

2. The method of claim 1, wherein generating a feature key embedding of the respective column name for the column comprises:

generating a first input sequence that comprises the respective column name; and processing the first input sequence using a language model neural network to generate the feature key embedding of the respective column name for the column.

3. The method of claim 2, wherein the first input sequence comprises a name associated with the tabular data structure.

4. The method of claim 2, wherein processing the first input sequence using a language model neural network to generate the feature key embedding of the respective column name of the column comprises:

processing the first input sequence using a language model neural network to generate an initial feature key embedding of the respective column name of the column; and processing the initial feature key embedding using an alignment layer to generate the feature key embedding of the respective column name of the column.

5. The method of claim 2, wherein generating a feature key embedding of the respective column name of the column comprises:

determining whether the feature key embedding for respective column name of the column appears in a memory that stores feature key embeddings of column names that appeared in training data for the foundation neural network; and only generating the first input sequence that comprises the respective column name of the column and processing the first input sequence using the language model neural network in response to determining that the feature key embedding for the respective column name of the column does not appear in the memory.

6. The method of claim 5, wherein generating a feature key embedding of the respective column name of the column comprises:

when the feature key embedding for the respective column name of the column appears in the memory that stores feature key embeddings of column names that appeared in training data for the foundation neural network, using the feature key embedding that appears in the memory as the feature key embedding.

7. The method of claim 2, wherein generating a feature value embedding of the respective entry in the column for the row comprises:

determining that the respective entry in the column for the row is a categorical feature value; and in response:

generating a second input sequence that comprises respective column name for the column and the respective entry in the column for the row; and processing the second input sequence using the language model neural network to generate the feature value embedding of the respective entry in the column for the row.

8. The method of claim 7, wherein the second input sequence comprises a name associated with the tabular data structure.

9. The method of claim 7, wherein processing the second input sequence using the language model neural network to generate the feature value embedding of the respective entry in the column for the row comprises:

processing the second input sequence using the language model neural network to generate an initial feature value embedding of the respective entry in the column for the row; and processing the initial feature value embedding using an alignment layer to generate the feature value embedding of the respective entry in the column for the row.

10. The method of claim 7, wherein generating a feature value embedding of the respective entry in the column for the row comprises:

determining whether the feature value embedding for the respective entry in the column for the row appears in a memory that stores feature value embeddings of entries that appeared in training data for the foundation neural network; and only generating the second input sequence and processing the second input sequence using the language model neural network in response to determining that the feature value embedding for the respective entry in the column for the row does not appear in the memory.

11. The method of claim 10, wherein generating a feature value embedding of the respective entry in the column for the row comprises:

when the feature value embedding for the respective entry in the column for the row appears in the memory that stores feature value embeddings of entries that appeared in training data for the foundation neural network, using the feature value embedding that appears in the memory as the feature value embedding.

12. The method of claim 2, wherein the language model neural network has been pre-trained prior to the training of the foundation neural network.

13. The method of claim 1, wherein generating a feature value embedding of the respective entry in the column for the row in the embedding space comprises:

determining that respective entry in the column for the row is a numerical feature value; and in response:

quantile normalizing the numerical feature value to generate the feature value embedding of the respective entry in the column for the row.

14. The method of claim 13, wherein quantile normalizing the numerical feature value to generate the feature value embedding of the respective entry in the column for the row comprises:

quantile normalizing and soft binning the numerical feature value to generate an initial feature value embedding; and processing the initial feature value embedding using an alignment layer to generate the feature value embedding of the respective entry in the column for the row.

15. The method of claim 1, wherein the foundation neural network comprises a sequence of attention layers that each update the respective embeddings of the feature key-feature value pairs by updating the respective feature key embedding and the respective feature value embedding in the respective embedding of the feature key-feature value pair, and wherein each attention layer comprises (i) a self-attention layer followed by (ii) a feed-forward layer block.

16. The method of claim 15, wherein each feed-forward layer block updates the respective embedding of each of the feature key-feature value pairs independently of each other respective embedding.

17. The method of claim 15, wherein the self-attention layer comprises one or more MapAttention layers, and wherein each MapAttention layer is configured to:

for each feature key-feature value pair, determine a respective value for the feature key in the pair from the feature key embedding in the respective embedding for the feature key-feature value pair;

for each feature key-feature value pair, determine a respective value for the respective entry in the column for the row from the feature value embedding in the respective embedding for the respective entry in the column for the row;

for each feature key-feature value pair, determine a respective query for the feature key-feature value pair from the feature key embedding in the respective embedding for the feature key-feature value pair;

for each feature key-feature value pair, determine a respective key for the feature key-feature value pair from the feature key embedding in the respective embedding for the feature key-feature value pair;

for each particular feature key-feature value pair:

determine a respective attention weight for each feature key-feature value pair from the respective query for the particular pair and the respective keys for the pairs;

apply the respective attention weights to the respective values for the feature values to generate an updated feature value embedding for the feature value in the particular pair; and apply the respective attention weights to the respective values for the feature keys to generate an updated feature key embedding for the feature key in the particular pair.

18. The method of claim 17, wherein the respective keys and queries for the pairs are not determined using any feature value embeddings.

19. The method of claim 17, wherein the task output comprises a prediction characterizing a particular feature value in the row of the tabular data structure, and wherein processing the respective embeddings of the feature key-feature value pairs using the foundation neural network to generate the task output for the row of the tabular data structure comprises:

processing the updated feature value embedding for the particular feature value using an output subnetwork to generate the prediction characterizing the particular feature value.

20. The method of claim 1, wherein the foundational neural network has been pre-trained on a plurality of training examples that each correspond to a respective training data structure through self-supervised learning.

21. The method of claim 20, wherein the pre-training comprises training the foundation neural network to predict masked out feature values that have been masked out from the respective training data structures.

22. The method of claim 20, wherein, after the pre-training, the foundation neural network has been fine-tuned on training data for the machine learning task.

23. The method of claim 20, wherein, prior to the pre-training, the respective key features in the training data structures have been pre-processed using the language model neural network to generate respective key embeddings for each of the respective columns.

24. A system comprising (ii) one or more computers that each include one or more processors and (ii) one or more storage devices storing instructions that are operable, when executed by the one or more computers, to cause the one or more computers to perform operations comprising:

receiving data that represents a row of a tabular data structure, wherein the tabular data structure has a plurality of columns each having a respective column name and the row of the tabular data structure has a respective entry in each of the plurality of columns, and wherein the data that represents the row comprises respective feature key-feature value pair for each of the plurality of columns;

generating, for each of the plurality of columns, a respective embedding of the respective feature key-feature value pair for the column, comprising, for each feature key-feature value pair:

generating a feature key embedding of the respective column name for the column in a first embedding space;

generating a feature value embedding of the respective entry in the column for the row in a second embedding space; and concatenating the feature key embedding of the respective column name for the column and the feature value embedding of the respective entry in the column for the row to generate the respective embedding of the feature key-feature value pair for the column; and processing the respective embeddings of the feature key-feature value pairs for the plurality of columns using a foundation neural network to generate a task output for the given row of the tabular data structure for a machine learning task.

25. A non-transitory computer storage medium encoded with instructions that, when executed by one or more computers, cause the one or more computers to perform operations comprising:

receiving data that represents a row of a tabular data structure, wherein the tabular data structure has a plurality of columns each having a respective column name and the row of the tabular data structure has a respective entry in each of the plurality of columns, and wherein the data that represents the row comprises a respective feature key-feature value pair for each of the plurality of columns;

generating, for each of the plurality of columns, a respective embedding of the respective feature key-feature value pair for the column, comprising, for each feature key-feature value pair:

generating a feature key embedding of the respective column name for the column in a first embedding space;

generating a feature value embedding of the respective entry in the column for the row in a second embedding space; and concatenating the feature key embedding of the respective column name for the column and the feature value embedding of the respective entry in the column for the row to generate the respective embedding of the feature key-feature value pair for the column; and processing the respective embeddings of the feature key-feature value pairs for the plurality of columns using a foundation neural network to generate a task output for the given row of the tabular data structure for a machine learning task.

26. The system of claim 24, wherein generating a feature key embedding of the respective column name for the column comprises:

generating a first input sequence that comprises the respective column name; and processing the first input sequence using a language model neural network to generate the feature key embedding of the respective column name for the column.

27. The system of claim 26, wherein processing the first input sequence using a language model neural network to generate the feature key embedding of the respective column name of the column comprises:

processing the first input sequence using a language model neural network to generate an initial feature key embedding of the respective column name of the column; and processing the initial feature key embedding using an alignment layer to generate the feature key embedding of the respective column name of the column.

28. The system of claim 26, wherein generating a feature key embedding of the respective column name of the column comprises:

determining whether the feature key embedding for respective column name of the column appears in a memory that stores feature key embeddings of column names that appeared in training data for the foundation neural network; and only generating the first input sequence that comprises the respective column name of the column and processing the first input sequence using the language model neural network in response to determining that the feature key embedding for the respective column name of the column does not appear in the memory.

29. The system of claim 24, wherein the foundational neural network has been pre-trained on a plurality of training examples that each correspond to a respective training data structure through self-supervised learning.

* * * * *